United States Patent [19]
Ditter, Jr.

[11] Patent Number: 5,317,680
[45] Date of Patent: May 31, 1994

[54] USING REGULAR GRAPHIC SHAPES TO IDENTIFY A POINTER-SELECTED GRAPHIC OBJECT

[75] Inventor: Donald J. Ditter, Jr., Phoenix, Ariz.

[73] Assignee: Brøderbund Software, Inc., Novato, Calif.

[21] Appl. No.: 542,109

[22] Filed: Jun. 22, 1990

[51] Int. Cl.⁵ .............................................. G06F 15/62
[52] U.S. Cl. .................................. 395/135; 395/139; 395/133; 395/155; 395/161
[58] Field of Search .............................. 395/133-139, 395/155, 157-160, 161; 364/401

[56] References Cited

U.S. PATENT DOCUMENTS

| | | | |
|---|---|---|---|
| 4,998,212 | 3/1991 | Dedieu et al. | 395/135 X |
| 5,032,989 | 7/1991 | Tornetta | 364/401 |
| 5,075,873 | 12/1991 | Seki et al. | 340/706 X |

Primary Examiner—Gary V. Harkcom
Assistant Examiner—Almis Jankus
Attorney, Agent, or Firm—Jordan M. Meschkow; Don J. Flickinger; Lowell W. Gresham

[57] ABSTRACT

A method quickly identifies an irregular graphic shape displayed on a video terminal. In an "off-line" operation, the method associates transparent regular graphic shapes, such as boxes, with the irregular graphic shapes. The regular graphic shapes do not overlap one another and are shaped, sized, and located so that one or more of the regular graphic shapes together approximate each irregular graphic shape. The regular graphic shapes are defined in a data table which includes a single data node for each of the regular graphic shapes. During the execution of an application computer program, the irregular graphic shapes are displayed at the video terminal, but the regular graphic shapes are not displayed. In addition, the application computer program manages a video pointer in real time so that a user may move the video pointer to any location on the display of the video terminal. The program investigates the table of regular graphic shapes to select a node corresponding to a regular graphic shape. The selected regular graphic shape is the one which is defined to overlay the area of the display where the video pointer resides. A corresponding irregular graphic shape is then identified through its association with the selected regular graphic shape. Once the irregular graphic shape has been identified, a predetermined activity, such as displaying a name, may take place with respect to that irregular graphic shape.

25 Claims, 5 Drawing Sheets

USING REGULAR GRAPHIC SHAPES TO IDENTIFY A POINTER-SELECTED GRAPHIC OBJECT

COPYRIGHT LICENSE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD OF THE INVENTION

The present invention relates generally to the operation of video terminals which display graphic objects. More specifically, the present invention relates to displaying a drawing having many graphic objects while simultaneously performing some action, such as displaying accessory data, related to a single one of the graphic objects.

BACKGROUND OF THE INVENTION

The use of graphic displays in connection with personal and other computers has become common place. Such graphic displays may present textual data and graphics. Textual data are commonly associated with literary arts and include information expressed as ASCII data, extended ASCII data, alpha-numeric data, and the like. Graphics are commonly associated with pictorial arts and include pictures, drawings, symbols, and other arrangements of color and shape. Graphics differ from textual data in that the quantity of computer memory needed to store or otherwise define a given visual area is typically substantially more for graphics than for textual data. However, the quantity of data needed to describe a graphics drawing often depends on the nature of the drawing.

Bit-mapping represents a straight-forward technique for defining a graphics image. In a bit-mapped image one or more bits of memory define the nature of each pixel to be enclosed in a graphics drawing. However, video terminal technology has advanced to a state where several hundred thousand pixels are included in each square inch of display. Moreover, pixels may exhibit many different colors, and additional memory is required to specify pixel color. Consequently, a large quantity of memory is required to define a graphics image which occupies an entire video terminal screen, and an entire drawing which may occupy many screens requires an enormous quantity of bit-mapped data.

The amount of data required to define bit-mapped graphics images is far too large to pose a realistic solution for use in many applications which operate on personal computers. For example, an application which seeks to display a variety of maps on a personal computer video terminal could easily consume more than the entire amount of long-term disk memory available on typical personal computers in storing definitions for the maps. Accordingly, various techniques are implemented to encode or otherwise compress this voluminous quantity of data for storage. When displayed, this data is decoded, processed, or otherwise expanded to a bit-mapped form for application to video control circuits and presentation at the video terminal.

Another commonly used technique for encoding graphics data defines perimeters of the objects included in a drawing. Thus, the amount of memory needed to define the drawing depends on the nature of the drawing. Even when a drawing includes several objects and the objects exhibit irregular shapes, sufficient memory space savings result to permit practical use of this technique for many applications which operate on personal computers. However, when a drawing includes several objects or when the objects have irregular shapes, a substantial amount of computer processing must be performed to decode the graphics data before it may be displayed or otherwise manipulated. In the map-displaying application discussed above, a map may include many objects or political regions, and the regions will typically exhibit extremely irregular shapes. Many maps may be encoded for use on a typical personal computer, and a significant amount of computer time must be dedicated to decoding the graphic data for video display or other processing.

The use of pointing devices has also become common place in connection with personal computers. Such pointing devices manipulate a video pointer using a keyboard, joystick, mouse, track-ball, or the like, in combination with controlling software. The pointer system provides display coordinates which define a location on the display where the video pointer should then be positioned. Often times, application software processes graphics data with respect to such display coordinates to identify a specific object indicated by the video pointer. Application specific software then performs an application-related activity with respect to the specified object. For example, computer aided design (CAD) programs often allow a user to select a graphic object using a video pointer. Typical CAD programs then perform some activity, such as enlarging, shrinking, moving, erasing, and the like, on the selected object.

Generally speaking, the computer processing time required to identify a pointer-selected graphic object is much greater for encoded graphic data than for bit-mapped graphic data. Moreover, the computer processing time needed to identify one of several irregularly shaped, encoded graphic objects is much greater than for corresponding regularly shaped, encoded graphic objects because irregular shapes require specification of many parameters to accurately characterize the object. Thus, CAD programs which utilize bit-mapped graphics or which manipulate relatively regular shapes may appear to perform an activity on a selected graphic object in real time. However, extensive delay occurs whenever graphic data encoding is employed with a drawing that includes many objects having irregular shapes.

SUMMARY OF THE INVENTION

Accordingly, it is an advantage of the present invention that an improved method for identifying a pointer-selected graphic object is provided.

Another advantage of the present invention is that an application program operates in real time to perform an activity specified by a pointer.

Yet another advantage is that the present invention operates upon encoded graphic data to quickly identify a selected graphic object.

Still another advantage is that the present invention quickly identifies a selected one of a multiplicity of irregular graphic shapes included on a drawing.

Another advantage is that the present invention overlays transparent regular graphic shapes on irregular graphic shapes, and processes only the regular graphic shapes to identify a selected irregularly-shaped graphic object.

Another advantage is that the present invention displays a map at a video terminal simultaneously with accessory data related to a selected region of the map.

TABLE I, presented below, provides a glossary of terms or phrases which are used herein as an aid in describing the present invention. For the purposes of the present invention, the normal meanings and usage of these terms and phrases are to be augmented by the definitions listed in TABLE I.

TABLE I

Regular graphic shape—a closed, two-dimensional geometric figure having sufficient symmetry so that it may be accurately described in both size and location using only a few parameters. For example, a circle may be accurately reconstructed from parameters which define the center coordinates and a radius. Likewise, a rectangle and various regular polygons may be accurately reconstructed from two parameters which define coordinates for selected vertices. Sectors and other polygons may be accurately reconstructed from only three or four parameters.

Irregular graphic shape—a closed, two-dimensional geometric figure having a generally unsymmetrical perimeter and being accurately represented in both size and location only by specifying a multiplicity of parameters. For example, a map of the border of Brazil may be reconstructed from parameters which define thousands of pixels which make up the border in a drawing of Brazil or from hundreds of small line segments which together approximate the perimeter.

The above and other advantages of the present invention are carried out in one form by a method for identifying a selected one of a plurality of graphic shapes or objects displayed on a video terminal. The method stores drawing data which collectively describe the graphic objects with respect to a drawing coordinate system. In addition, the method stores overlay data which collectively describe regular graphic shapes. Each of these regular graphic shapes is associated with a corresponding one of graphic objects through the use of the drawing coordinate system. The drawing data is converted into a display or screen of the graphic objects at the video terminal. Selected coordinates of the drawing coordinate system are obtained from a pointing device, and the method then determines which of the regular graphic shapes includes the selected coordinates therein.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENT

Figure 1:
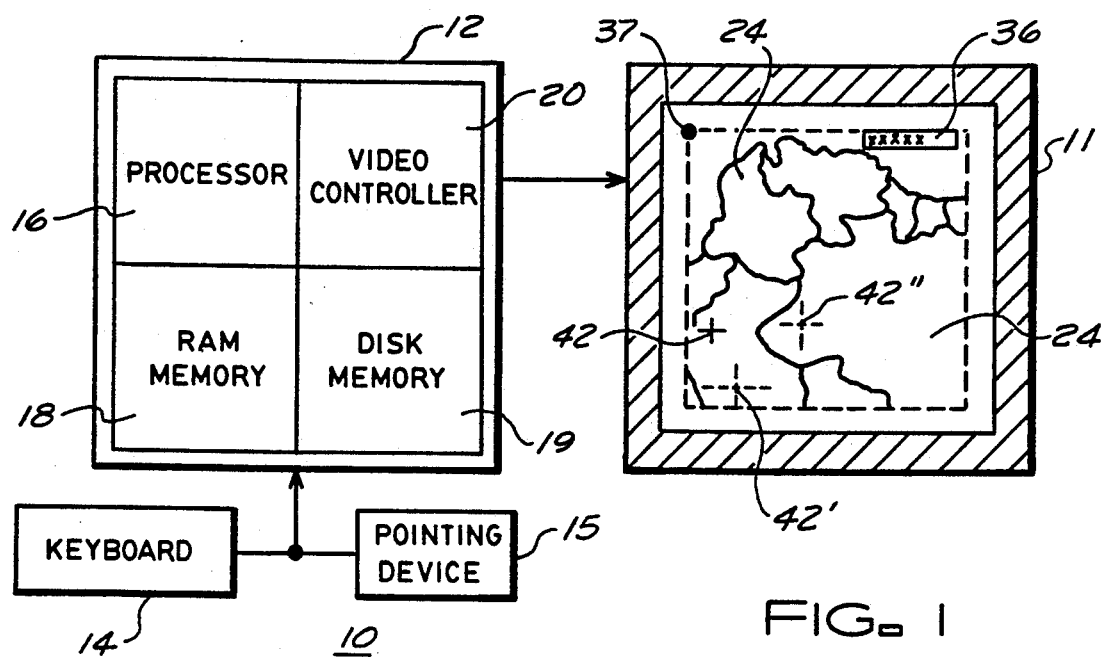
FIG. 1 shows a block diagram of components included in a personal computer configured in accordance with the teaching of the present invention.

FIG. 1 shows a block diagram of a personal computer 10 wherein the preferred embodiment of the present invention is practiced. Computer 10 includes a video terminal 11, a control unit 12, a keyboard 14, and an optional pointing device 15. Any conventional mouse, joystick, track-ball, and the like may suffice for pointing device 15. Control unit 12 includes a processor 16, random access memory (RAM) 18, disk memory 19, and a video controller 20. As is conventional in the computer arts, processor 16 executes instructions stored in RAM 18 to obtain information from keyboard 14 and pointing device 15, access and manipulate data stored within RAM 18 and disk memory 19, and to control the visual display of data on video terminal 11 through video controller 20. In accordance with the present invention, video terminal 11 and video controller 20 cooperate to display graphics data using any of the conventional graphics standards, such as CGA, EGA, VGA, and the like.

Figure 2:
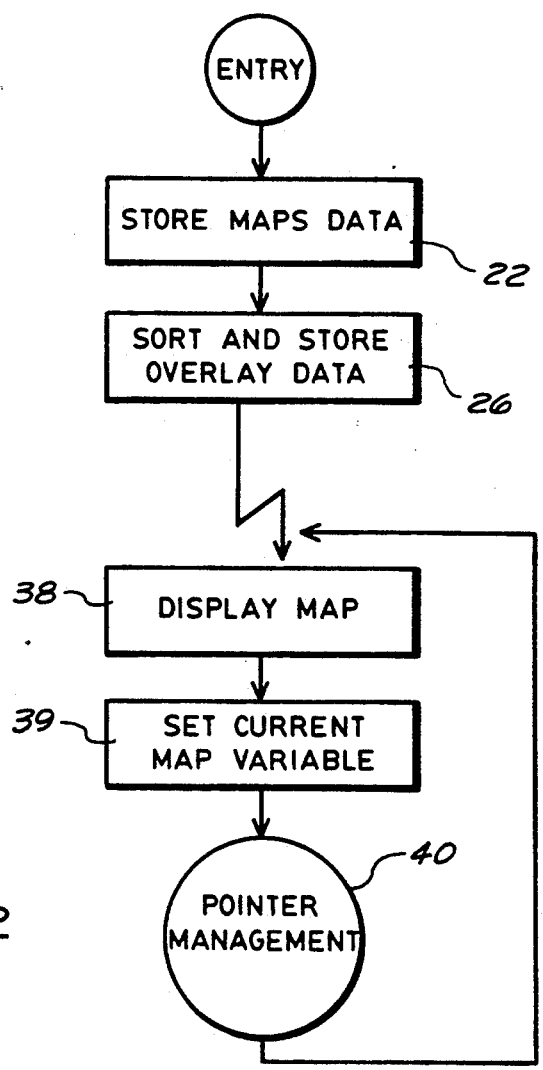
FIG. 2 shows a flow chart of tasks performed in accordance with the method of the present invention.

FIG. 2 shows a flow chart of tasks performed in accordance with the method of the present invention. With reference to FIGS. 1 and 2, a task 22 of the present invention stores or otherwise retains data within disk memory 19. In the preferred embodiment of the present invention this data define various maps which may be displayed at video terminal 11. The precise form of this data stored by task 22 is not important to the present invention. Any coding of data which, when decoded by processor 16 and presented to video controller 20, causes video terminal 11 to display a map or a portion thereof is contemplated by the present invention.

Figure 3:
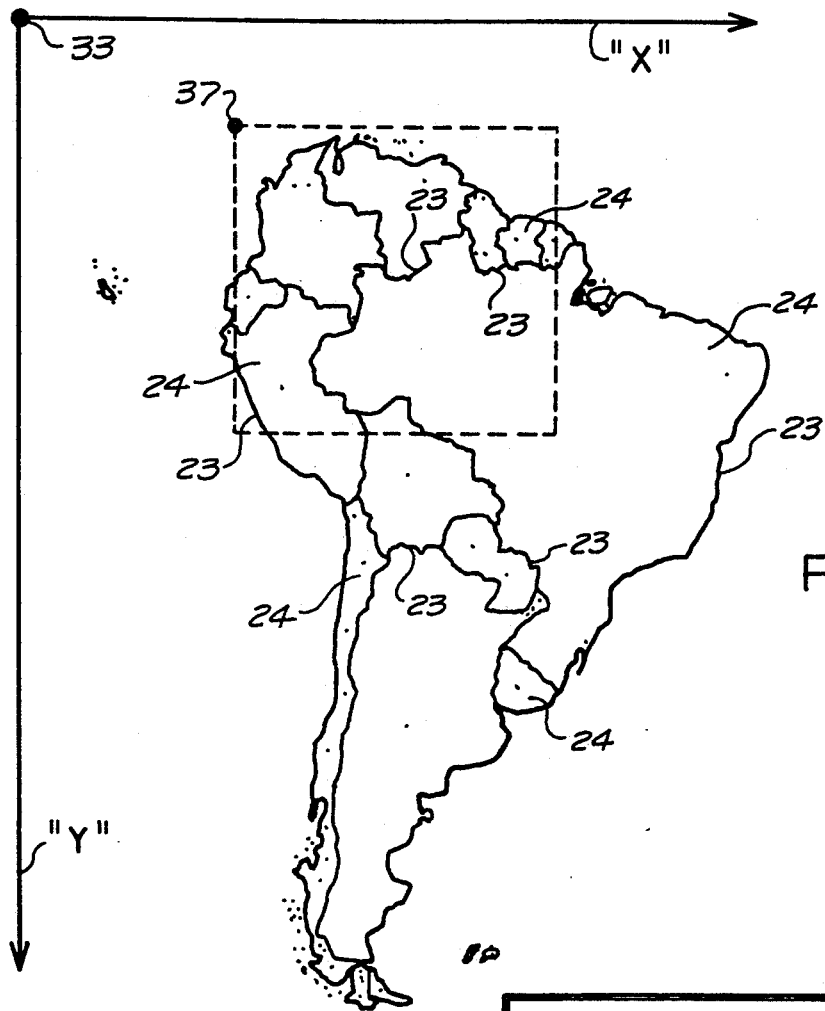
FIG. 3 shows an exemplary drawing which, in accordance with the present invention, includes a multiplicity of irregular graphic shapes.

FIG. 3 shows an example map that illustrates South America. The preferred embodiment of the present invention encodes map data with respect to a map or drawing coordinate system, illustrated by axes "X" and "Y". With respect to this map coordinate system, any point on the map may be represented in terms of "X" and "Y" coordinates. In the preferred embodiment, the map data stored by task 22 define a multiplicity of small line segments with respect to this map coordinate system. When these line segments are displayed at video terminal 11, they collectively approximate borders 23 of the geo-political regions 24 of the map. In alternate embodiments where such data define a generic drawing rather than a map, such line segments may be viewed as approximating the perimeters of objects of the drawing. As is typical with most maps and with many other types of drawings, such regions or objects 24 are irregular graphic shapes (see TABLE I).

With reference back to FIG. 2, a task 26 stores sorted overlay data. The overlay data are stored in disk memory 19 (see FIG. 1) along with an application computer program which is executed to display the map data. When this computer program is executed, the overlay data are transferred to RAM 18 for rapid access by processor 16. Overlay data define regular graphic shapes (see TABLE I) with respect to the same "X,Y" map coordinate system that is used in connection with task 22.

Figures 4, 8:
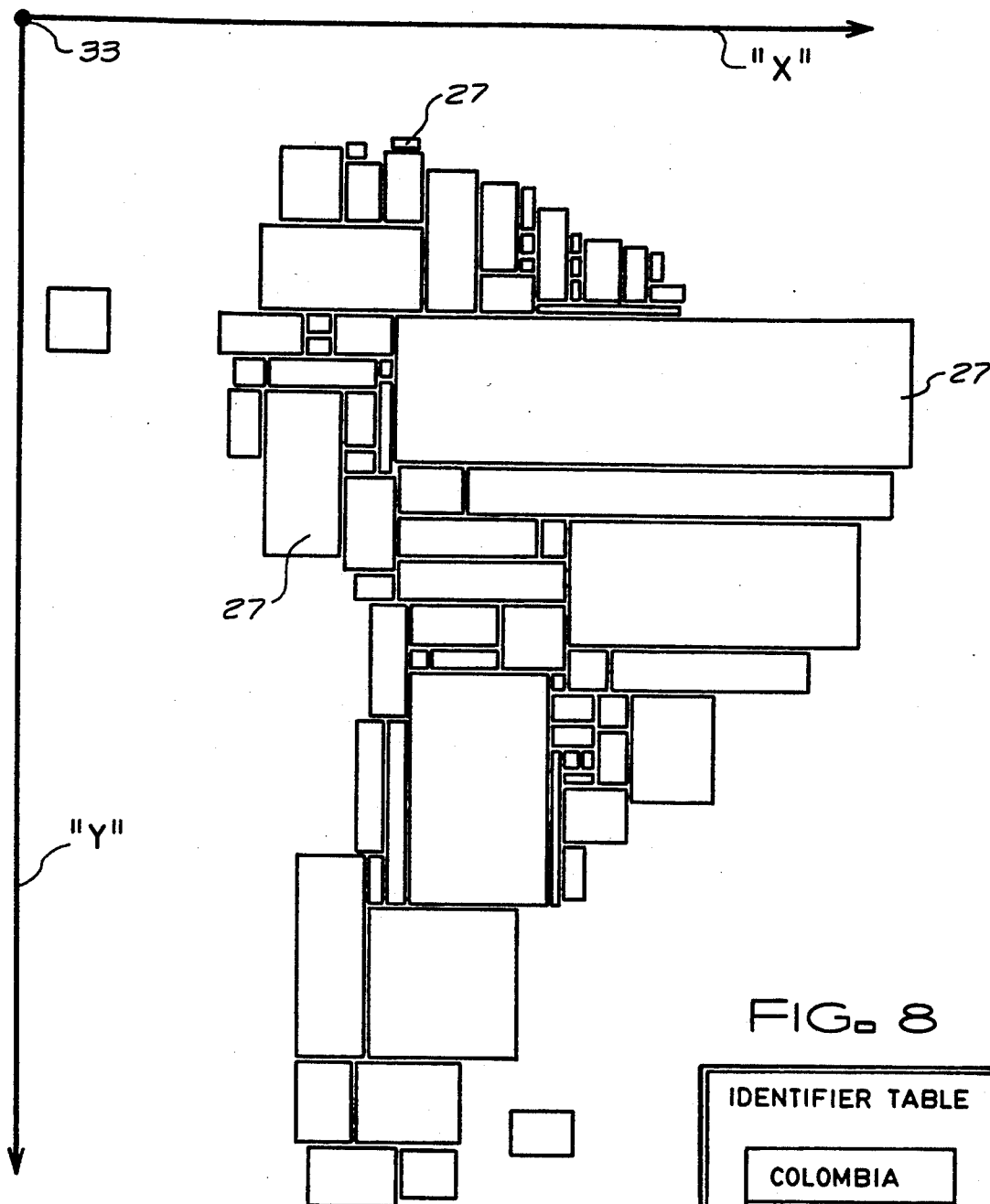
FIG. 4 shows an exemplary transparent in accordance with the present invention, includes a multiplicity of regular graphic shapes.
FIG. 8 shows an optional identifier table configured in accordance with the present invention.
Figure 5:
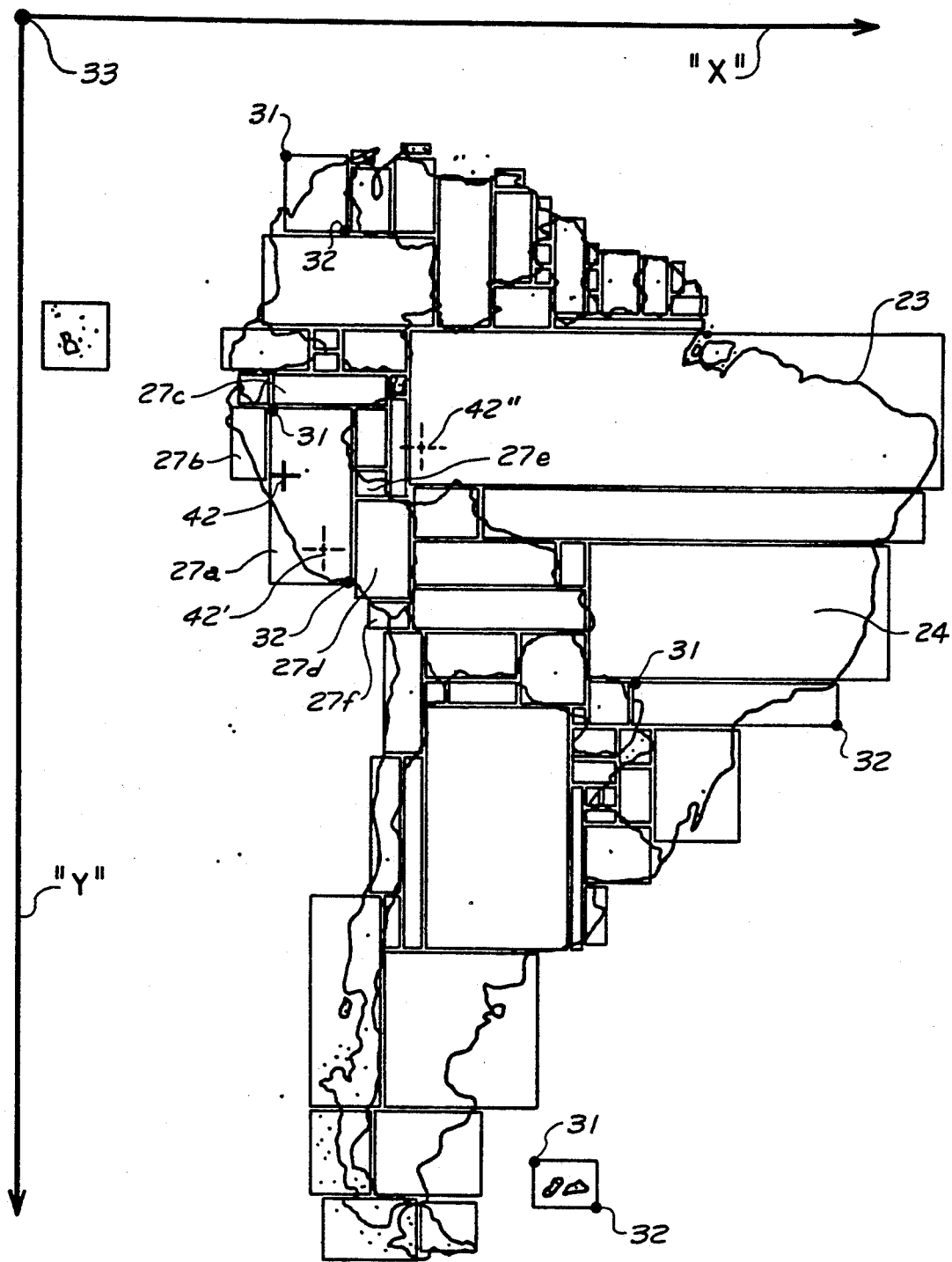
FIG. 5 shows a combination of the drawing and overlay shown in FIGS. 3 and 4, respectively.

FIG. 4 shows an exemplary transparent overlay which is defined by this overlay data and which includes a multiplicity of regular graphic shapes. As shown in FIG. 4, the preferred embodiment utilizes rectangles or boxes 27 for the regular graphic shapes. FIG. 5 shows a combination of the map shown in FIG. 3 and the overlay shown in FIG. 4 with respect to the common "X,Y" coordinate system. As shown in FIG. 5, boxes 27 are defined to have predetermined sizes, shapes, and locations so that they roughly approximate corresponding regions 24. For example, boxes 27a, 27b, 27c, 27d, 27e, and 27f collectively approximate the shape and location of Peru with respect to the map of FIG. 5. Other ones of boxes 27 collectively approximate the shapes and locations of other countries in South America. The overlay is transparent to a user of the present invention because the present invention does not display the overlay of FIG. 4 or the combination of FIG. 5 at video terminal 11 (see FIG. 1).

Figure 6:
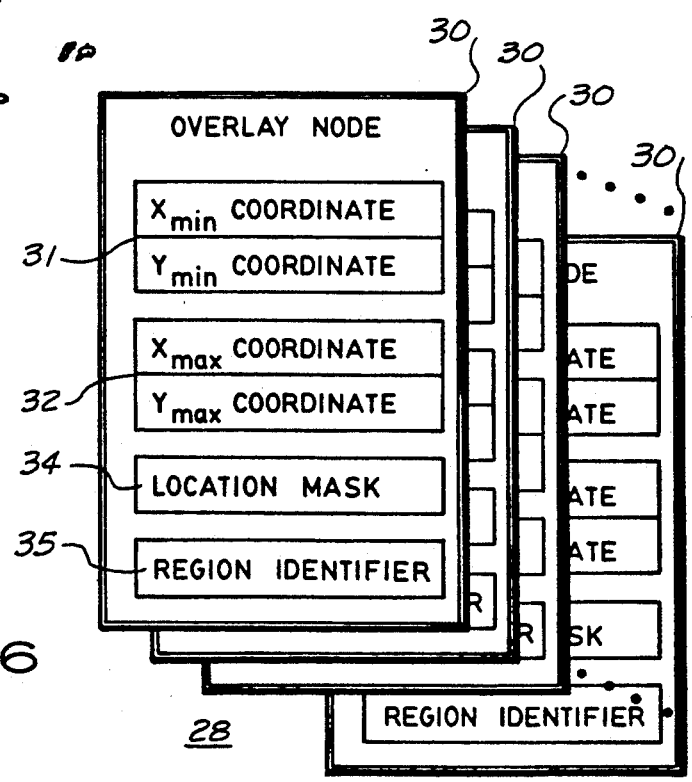
FIG. 6 shows an overlay table configured in accordance with the present invention.

FIG. 6 shows an overlay table 28 that the preferred embodiment of the present invention uses for storing sorted overlay data. Table 28 includes overlay data that are associated with a particular map or series of maps. These overlay data are organized into a multiplicity of overlay nodes 30, where a single unique node 30 stores the overlay data needed to characterize a single box 27 (see FIGS. 4-5). Thus, table 28 includes a multiplicity of nodes 30 to characterize a corresponding multiplicity of boxes 27.

Each overlay node 30 includes parameters which locate two vertices on the box 27 defined thereby. Specifically, $X_{min}$ and $Y_{min}$ coordinates define a minimum vertex 31 with respect to the map coordinate system, and $X_{max}$ and $Y_{max}$ coordinates define a maximum vertex 32 with respect to the map coordinate system. As shown in FIG. 5, minimum vertex 31 for box 27a is the point closest to an origin 33 of the "X,Y" map coordinate system, and maximum vertex 32 for box 27a is the point farthest from the origin of the coordinate system. For each box 27, the corresponding minimum vertex 31 and maximum vertex 32 completely and accurately specify the shape, size, and location of the box 27.

Referring back to FIG. 6, overlay nodes 30 are sorted within table 28 so that they reside in order of increasing $X_{min}$ coordinates. For nodes 30 having equal $X_{min}$ coordinate values, such nodes are further sorted so that they reside in order of increasing $Y_{min}$ coordinates, and so on. Accordingly, as discussed in more detail below, the method of the preferred embodiment of the present invention may quickly search table 28 to find a specific overlay node 30.

Each overlay node 30 in overlay table 28 includes additional data related to its corresponding map and map region. For example, a map location mask 34 is configured to indicate the map to which the overlay node 30 pertains. For example, box 27a (see FIG. 5) may relate to a map of South America and to a map of the world. However, box 27a would not relate to a map of North America. When the method of the present invention coordinates several maps, location mask 34 may be used to speed region identification.

In addition, each overlay node 30 may include accessory data or a link to such accessory data. As shown in FIG. 6, each overlay node 30 includes a region identifier 35. Identifier 35 represents a country number that the method of the present invention may use to obtain a country name, then display that country name within a window 36 of video terminal 11 (see FIG. 1).

With reference back to FIG. 2, tasks 22 and 26 need not be performed in any particular order. The sorting and storing of tasks 22 and 26 preferably occur prior to execution of any application software which actually displays maps on video terminal 11. On the other hand, a task 38 occurs under the control of such application software. Task 38 causes the application software to access the map data stored in task 22 and display a map on video terminal 11 in accordance with such data. Task 38 performs any necessary map data decoding and may advantageously be configured so that only a single screen or portion of the map shows on video terminal 11. For example, task 38 may configure a single screen to display only the northwest portion of South America, as shown in FIG. 1. In addition, task 38 saves coordinate offsets for a point 37 of the map which is both currently displayed on video terminal 11 and resides closest to map coordinate system origin 33, as shown in FIGS. 1 and 3.

After task 38, a task 39 sets a current map variable to indicate the specific map currently on display at video terminal 11. For example, if the application software manages maps for various regions of the world, then a code which identifies a particular map, such as a map of South America, is stored in the current map variable.

After task 39, the method of the present invention performs a pointer management routine 40. Generally speaking, routine 40 manages a video pointer 42 (see FIG. 1) in response to commands from a user (not shown). Such commands may originate from keyboard 14 or pointing device 15 (see FIG. 1). FIG. 1 illustrates video pointer 42 as being a cross-hair, but arrows or other icons may suffice. In response to movement in video pointer 42, routine 40 identifies the region 24 in which video pointer 42 resides, and takes an appropriate action. In the preferred embodiment of the present invention, that action causes the name of the region to be displayed in window 36.

Figure 7:
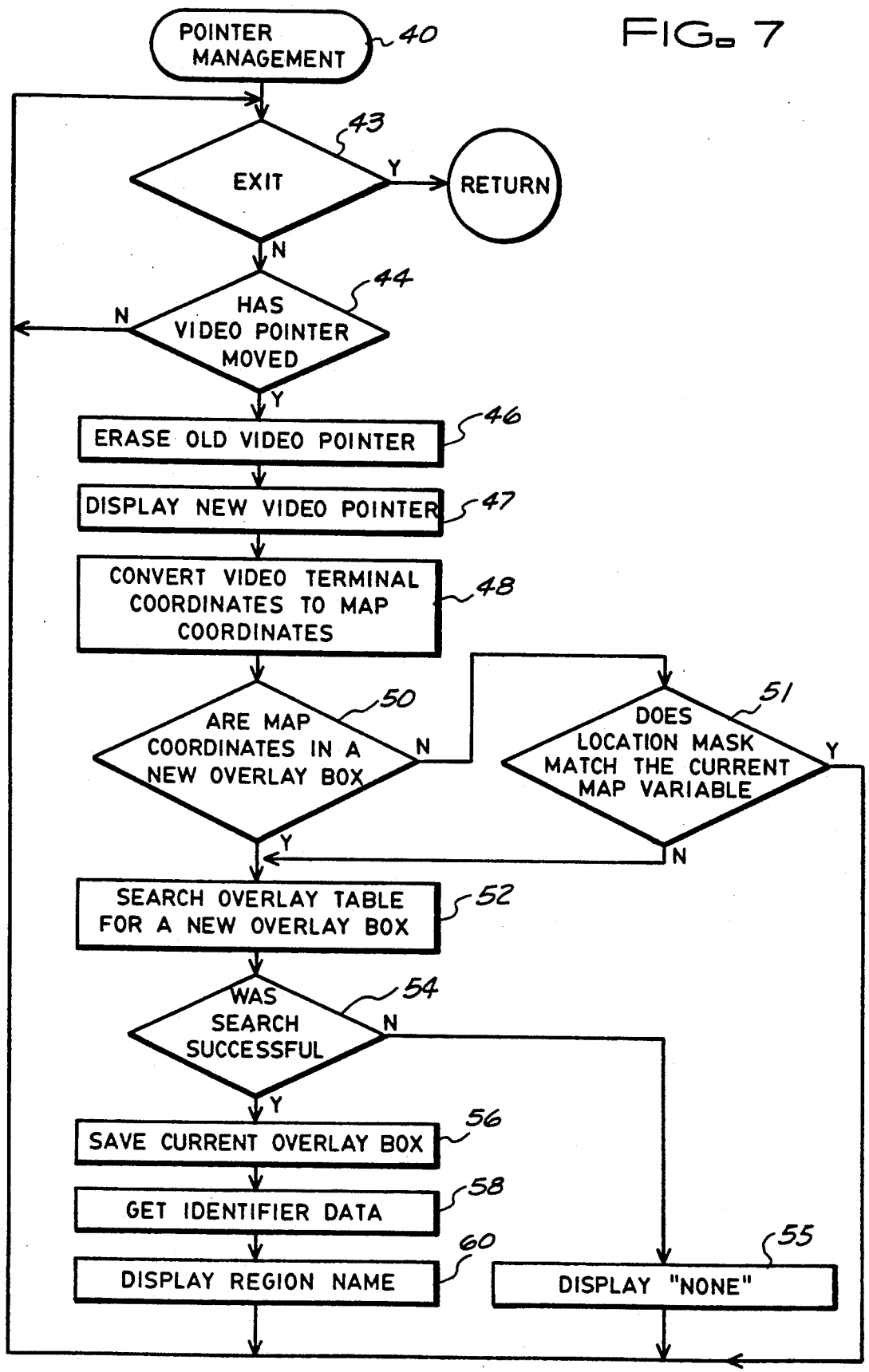
FIG. 7 shows a flow chart of a pointer management routine performed in accordance with the method of the present invention.

FIG. 7 shows a flow chart of pointer management routine 40. Upon entry to routine 40, a query task 43 determines whether a user instructs an exit from routine 40. Such an instruction may be detected through keyboard 14 or pointing device 15 in a conventional manner. When an exit condition is detected, routine 40 exits and returns to display map task 38, shown in FIG. 2. On the other hand, if query task 43 fails to detect an exit condition, routine 40 performs a query task 44.

Task 44 determines whether an input instructing video pointer movement has been received. Keyboard 14 or pointing device 15 may be used to send such an instruction in a conventional manner. Thus, task 44 examines current display coordinates for video pointer 42, as received from keyboard 14 or pointing device 15. Task 44 compares these current display coordinates with a variable (not shown) that specifies display coordinates for the actual location of video pointer 42 on video terminal 11. If the two sets of coordinates match, then no video pointer movement command has been detected. When no video pointer movement command is detected at task 44, program control returns to task 43.

When task 44 determines that the actual location of video pointer 42 does not match the commanded location from keyboard 14 or pointing device 15, a video pointer movement command is performed by exiting task 44 and proceeding to a task 46. Task 46 sends appropriate commands to video controller 20 (see FIG. 1) to erase the old video pointer. Next, a task 47 sends appropriate commands to video controller 20 to cause a new video pointer 42, such as video pointer 42′, (see FIG. 1) to be displayed at video terminal 11. New video pointer 42′ is displayed at the location commanded by input coordinates received from keyboard 14 or pointing device 15. For clarity, FIG. 1 shows video pointer 42 and new video pointer 42′ distantly located from one another. Of course, those skilled in the art will recognize that routine 40 may operate in real time so that the new location of video pointer 42′ actually resides very near to the old location of video pointer 42. Accordingly, a user may cause video pointer 42 to move in a smooth, continuous fashion throughout the display on video terminal 11.

After task 47, a task 48 converts display coordinates for the new video pointer 42 into coordinates for the map being displayed. As discussed above in connection with FIGS. 3-5, map regions 24 and boxes 27 share a common map coordinate system. Furthermore, this coordinate system need not coincide with any coordinate system for the current display on video terminal 11. For example, the display illustrated in FIG. 1 shows only the northwestern section of South America, and the display coordinates do not coincide with the map coordinate system shown in FIGS. 3-5. Task 48 converts display coordinates to map system coordinates by adding appropriate "X" and "Y" offsets to the display coordinates. These offsets were previously saved, as discussed above in connection with task 38 (see FIG. 2).

After the conversion of task 48, a query task 50 examines these map coordinates to determine if video pointer 42 resides in a new overlay box 27 (see FIGS. 4-5). The coordinates of the current overlay box 27 have been previously saved, as discussed below in connection with a task 56. Task 50 compares the map coordinates of video pointer 42 against the vertex coordinates 31-32 (see FIG. 6) associated with the current box 27 and overlay node 30. If CONDITION I, presented below, is true for "X" axis map system coordinate $VP_X$ of video pointer 42 and "Y" axis map system coordinate $VP_Y$ of video pointer 42, then video pointer 42′ resides in the current box 27:

CONDITION I $(X_{min} \leq VP_X \leq X_{max})$ AND $(Y_{min} \leq VP_Y \leq Y_{max})$ where:
$X_{min}$ and $Y_{min}$ specify vertex 31 as defined in overlay node 30 for the current box 27; and
$X_{max}$ and $Y_{max}$ specify vertex 32 as defined in overlay node 30 for the current box 27.
CONDITION I is true for video pointer 42′, as shown in FIG. 5. When video pointer 42′ resides in the current overlay box 27, program control proceeds from query task 50 to a query task 51. Task 51 determines whether the current map variable, saved above in connection with task 39 (see FIG. 2) matches one of the maps specified in the location mask 34 (see FIG. 6) for the overlay node 30 that describes the current box 27. If it does, then routine 40 need not take any new action, and program control returns to task 43. However, a user may have caused program control to exit routine 40 and display a new map at task 38 (see FIG. 2). In this situation, program control proceeds to a task 52.

Likewise, program control proceeds to task 52 when query task 50 detects a video pointer 42 that resides in a new overlay box 27. In other words, video pointer 42 has been moved across a border of an overlay box 27. Video pointer 42″ in FIGS. 1 and 5 illustrates this situation with respect to video pointer 42. Thus, task 52 searches overlay table 28 (see FIG. 6) to identify the overlay box 27 in which video pointer 42 now resides. Generally speaking, task 52 finds the overlay node 30 for which CONDITION I is true and for which location mask 34 (see FIG. 6) is enabling.

As discussed above, overlay table 28 is sorted so that overlay nodes 30 reside in order of increasing $X_{min}$ coordinates. Task 52 may quickly detect the first overlay node 30 in overlay table 28 for which $VP_X \geq X_{min}$. A binary search or other searching technique may be used to make this determination. Once this overlay node 30 has been located, the search may proceed forward through the table 28 until an overlay node 30 is found for which: a) $VP_Y \geq Y_{min}$; b) $VP_X \leq X_{max}$; c) $VP_Y \leq Y_{max}$; and, d) location mask 34 is enabling for the current map. However, nothing requires the search to be successful. In other words, it is possible for video pointer 42 to reside at a portion of the map for which a corresponding overlay box 27 has not been defined.

After task 52, a query task 54 determines whether the search was successful. When no suitable overlay box 27 can be identified, program control proceeds to a task 55, which takes an appropriate action in response to the failure to find a suitable overlay box 27. In the preferred embodiment of the present invention, this action causes the word "NONE" to be displayed in window 36 (see FIG. 1). Thus, the word "NONE" appears in window 36 when video pointer 42 is located in an area of the map which does not reside within the domain of any country. The oceans may, for example, be regarded as such areas. After task 55, program control proceeds back to the top of the loop at task 43.

When query task 54 determines that the search of task 52 ended successfully, a task 56 saves the overlay node 30 which identifies the newly found overlay box 27. Preferably, task 56 simply saves an index into overlay table 28 so that this overlay node 30 may be quickly accessed during tasks 50 and 51, discussed above.

Next, a task 58 retrieves identifier data, such as region identifier 35 (see FIG. 6), from the newly found overlay node 30. Such identifier data may simply provide ASCII data describing the name of the country within which this overlay box 27 would substantially reside if combined with the map as shown in FIG. 5. However, in the preferred embodiment region identifier 35 provides an index number into an identifier table 59, as shown in FIG. 8. Using this index, task 58 may quickly obtain data describing a country name. In other generic applications, such identifier data may identify other more complex data structures.

After task 58, a task 60 performs a specified activity with respect to the identifier data obtained in task 58. In the preferred embodiment, task 60 causes a country name to be displayed in window 36 (see FIG. 1). However, nothing prevents other activities from taking place. For example, task 58 may additionally fill the identified object with a specified color using conventional fill techniques. After task 60, program control returns to the top of the loop for routine 40 at task 43.

In summary, the present invention provides an improvement in identifying pointer-selected graphic objects. Specifically, the present invention permits extensive data encoding in connection with irregular graphic shapes. Thus, the data needed to describe a vast quantity of graphic displays may be condensed for storage in memory. In addition, the present invention permits quick identification of such irregular graphic shapes without processing the data which define the irregular graphic shapes. Rather, the present invention associates regular graphic shapes, such as boxes, with the irregular graphic shapes so that one or more of such regular graphic shapes combine to approximate each irregular graphic shape. However, such regular graphic shapes are not displayed and are therefore transparent to the user. This association occurs "off-line," or prior to executing a program in which such quick identification must occur. The method of the present invention then processes data describing the regular graphic shapes to identify corresponding irregular graphic shapes. The regular graphic shapes are described using a relatively small quantity of data and may be processed quickly. In the preferred embodiment of the present invention, a map of all countries in the world has only 1098 transparent boxes which approximate the shapes of the countries, or map regions. The preferred embodiment operates a video pointer in real time to identify a country in which the video pointer resides and to display the identified country's name in a window.

The present invention has been described above with reference to a preferred embodiment. However, those skilled in the art will recognize that changes and modifications may be made in this preferred embodiment without departing from the scope of the present invention. For example, those skilled in the art will recognize that the present invention is not limited to use in connection with displaying any particular map but may easily be adapted for use in connection with any map or with a wide variety of drawings other than maps. In addition, those skilled in the art will recognize that the precise data structures, tasks, and ordering of tasks described above are not critical features in the present invention. Rather, those skilled in the art may devise alternate data structures, tasks, and task sequencing to perform substantially the same method as described above. These and other changes and modifications which are obvious to those skilled in the art are intended to be included within the scope of the present invention.

What is claimed is:

1. A method of identifying a selected one of a plurality of irregularly shaped graphic objects displayed on a video terminal, said method comprising the steps of:
    storing drawing data which describe said graphic objects with respect to a drawing coordinate system;
    storing overlay data which describe regular graphic shapes compared to said irregularly shaped graphic objects, each of said regular graphic shapes being associated through said drawing coordinate system with a corresponding one of said graphic objects;
    for each of said regular graphic shapes, managing said regular graphic shapes so that a plurality of said regular graphic shapes are associated with one of said graphic objects;
    for each of said regular graphic shapes, locating and sizing said plurality of said regular graphic shapes so that if said plurality of said regular graphic shapes were overlaid on said one graphic object, said plurality of said regular graphic shapes would together roughly approximate the shape of said one of said graphic objects;
    converting said drawing data into a display of said plurality of graphic objects at said video terminal;
    obtaining selected coordinates of said drawing coordinate system; and
    determining the one of said regular graphic shapes in which said selected coordinates reside.

2. A method as claimed in claim 1 wherein said storing overlay data step comprises the step of managing said regular graphic shapes so that at least one of said regular graphic shapes is associated with each of said graphic objects and so that each of said regular graphic shapes is associated with only one of said graphic objects.

3. A method as claimed in claim 1 additionally comprising the step of refraining from displaying said regular graphic shapes at said video terminal.

4. A method of operating a video terminal to display at least a portion of a drawing while further displaying accessory data related to a selected one of a plurality of irregular graphic shapes included in said drawing, said method comprising the steps of:
    storing drawing data which describe said irregular graphic shapes of said drawing with respect to a drawing coordinate system;
    storing overlay data which describe regular graphic shapes, each of said regular graphic shapes being associated through said drawing coordinate system with a corresponding one of said irregular graphic shapes;
    for each of said regular graphic shapes, managing said regular graphic shapes so that each of said regular graphic shapes occupies an area of said drawing which is unoccupied by another one of said regular graphic shapes;
    for each of said regular graphic shapes, associating accessory data with said overlay data;
    converting said drawing data into a display of said drawing at said video terminal;
    obtaining selected coordinates of said drawing coordinate system;
    determining the one of said regular graphic shapes in which said selected coordinates reside; and
    displaying the accessory data which correspond to said one of said regular graphic shapes.

5. A method as claimed in claim 4 wherein:
    each of said irregular graphic shapes occupies an area of said drawing which is unoccupied by another one of said irregular graphic shapes; and
    said storing overlay data step associates said regular graphic shapes with said irregular graphic shapes by locating and sizing each of said regular graphic shapes to occupy at least a portion of the area occupied by said corresponding one of said irregular graphic shape.

6. A method as claimed in claim 4 wherein said storing overlay data step comprises the step of managing said regular graphic shapes so that at least one of said regular graphic shapes is associated with each of said irregular graphic shapes and so that each of said regular graphic shapes is associated with only one of said irregular graphic shapes.

7. A method as claimed in claim 4 wherein said storing overlay data step comprises the steps of:
   managing said regular graphic shapes so that a plurality of said regular graphic shapes is associated with one of said irregular graphic shapes; and
   locating and sizing said plurality of said regular graphic shapes so that if said plurality of said regular graphic shapes were overlaid on said drawing, said plurality of said regular graphic shapes would together roughly approximate the shape of said one of said irregular graphic shapes.

8. A method as claimed in claim 4 wherein:
   said regular graphic shapes are rectangles; and
   said storing overlay data step comprises the step of retaining, for each of said regular graphic shapes, first and second overlay coordinates relative to said drawing coordinate system, said first and second overlay coordinates identifying diametrically opposed vertices of said rectangle.

9. A method as claimed in claim 8 additionally comprising the step of sorting said overlay data by said overlay coordinates so that said overlay data are stored in a predetermined order relative to one another.

10. A method as claimed in claim 9 wherein said determining step comprises the step of searching said overlay data to compare said overlay coordinates with said selected coordinates.

11. A method as claimed in claim 4 additionally comprising the step of refraining from displaying said regular graphic shapes at said video terminal.

12. A method as claimed in claim 4 wherein said obtaining step comprises the steps of:
   obtaining display coordinates from a pointing device; and
   converting said display coordinates into said drawing coordinates.

13. A method of operating a video terminal to display a map of a multiplicity of regions generally having diverse shapes and to simultaneously display accessory data related to a selected one of said regions, said method comprising the steps of:
   storing map data which describe perimeters of said regions with respect to a map coordinate system;
   storing overlay data which describe rectangles, each of said rectangles being associated through said map coordinate system with a corresponding one of said regions;
   for each of said rectangles, managing said rectangles so that at least one of said rectangles is associated with each of said regions and so that each of said rectangles is associated with only one of said regions;
   for each of said rectangles, associating data with said overlay data;
   displaying said map at said video terminal using said map data;
   obtaining selected coordinates of said map coordinate system;
   determining the one of said rectangles in which said selected coordinates reside; and
   displaying the accessory data which correspond to said one of said rectangles.

14. A method as claimed in claim 13 additionally comprising the step of refraining from displaying said rectangles at said video terminal.

15. A method as claimed in claim 13 wherein said storing overlay data step comprises the steps of:
   managing said rectangles so that a plurality of said rectangles are associated with one of said regions; and
   locating and sizing said plurality of said rectangles so that if said plurality of said rectangles were overlaid on said map, said plurality of said rectangles would together roughly approximate the shape of said one of said regions.

16. A method as claimed in claim 13 wherein said storing overlay data step comprises the step of retaining, for each of said rectangles, first and second overlay coordinates relative to said map coordinate system, said first and second overlay coordinates identifying diametrically opposed vertices of said rectangle.

17. A method as claimed in claim 16 additionally comprising the step of sorting said overlay data by said overlay coordinates so that said overlay data are stored in a predetermined order relative to one another.

18. A method as claimed in claim 17 wherein said determining step comprises the step of searching said overlay data to compare said overlay coordinates with said selected coordinates.

19. A method of operating a video terminal to display one of a plurality of maps, wherein each map includes a multiplicity of regions, and to simultaneously display a name of a selected one of said regions, said method comprising the steps of:
   for each of said maps, storing map data which describe perimeters of said regions with respect to a map coordinate system;
   storing overlay data nodes to describe rectangles, each of said rectangles having an overlay data node associated therewith and being associated through said map coordinate system with a corresponding one of said regions;
   associating a name with each of said overlay data nodes;
   displaying one of said maps at said video terminal using said map data;
   obtaining display coordinates from a pointing device;
   converting said display coordinates into selected coordinates of said map coordinate system for said displayed map;
   evaluating said overlay data nodes to determine the overlay data node which describes the one of said rectangles in which said selected coordinates reside; and displaying the name which is associated with the overlay data node determined in said evaluating step.

20. A method as claimed in claim 19 wherein said storing overlay data nodes step comprises the steps of:
   managing said rectangles so that a plurality of said rectangles are associated with one of said regions; and
   locating and sizing said plurality of said rectangles so that if said plurality of said rectangles were overlaid on said one of said regions, said plurality of said rectangles would together roughly approximate the shape of said one of said regions.

21. A method as claimed in claim 19 wherein said storing overlay data nodes step comprises the step of retaining, for each of said overlay data nodes, first and second overlay coordinates relative to one of said map coordinate systems, said first and second overlay coordinates identifying diametrically opposed vertices of a rectangle.

22. A method as claimed in claim 21 additionally comprising the step of sorting said overlay data nodes by said overlay coordinates so that said overlay data nodes are stored in a predetermined order relative to one another.

23. A method as claimed in claim 22 wherein said evaluating step comprises the step of searching said overlay data nodes to compare said overlay coordinates with said selected coordinates.

24. A method as claimed in claim 23 wherein:
said method additionally comprises the step of associating a map identifier with each of said overlay data nodes; and
said evaluating step additionally comprises the step of comparing said displayed one of said maps with said map identifier.

25. A method of identifying a selected one of a plurality of irregularly shaped graphic objects displayed on a video terminal, said method comprising the steps of:

storing drawing data which describe said graphic objects with respect to a drawing coordinate system;

storing overlay data which describe rectangles compared to said irregularly shaped graphic objects, each of said rectangles being associated through said drawing coordinate system with a corresponding one of said graphic objects;

retaining, for each of said rectangles, first and second overlay coordinates relative to said drawing coordinate system, said first and second overlay coordinates identifying diametrically opposed vertices of said rectangle;

converting said drawing data into a display of said plurality of graphic objects at said video terminal;

obtaining selected coordinates of said drawing coordinate system; and determining the one of said regular graphic shapes in which said selected coordinates reside.

* * * * *

UNITED STATES PATENT AND TRADEMARK OFFICE
CERTIFICATE OF CORRECTION

PATENT NO. : 5,317,680

DATED : 31 May 1994

INVENTOR(S) : Donald J. Ditter, Jr.

It is certified that error appears in the above-identified patent and that said Letters Patent is hereby corrected as shown below:

Column 11, Line 54 (Claim 13), please insert --accessory-- after "associating"

Signed and Sealed this

Sixth Day of September, 1994

Attest:

BRUCE LEHMAN

Attesting Officer          Commissioner of Patents and Trademarks